(No Model.)  2 Sheets—Sheet 1.

C. B. ADAMS.
METHOD OF PHOTOGRAMMETRY.

No. 510,758.  Patented Dec. 12, 1893.

WITNESSES:
Fred G. Dieterich
W. D. Blondel

INVENTOR
Cornele B. Adams
BY Munn & Co.
ATTORNEYS.

THE NATIONAL LITHOGRAPHING COMPANY,
WASHINGTON, D. C.

(No Model.) 2 Sheets—Sheet 2.
C. B. ADAMS.
METHOD OF PHOTOGRAMMETRY.
No. 510,758. Patented Dec. 12, 1893.
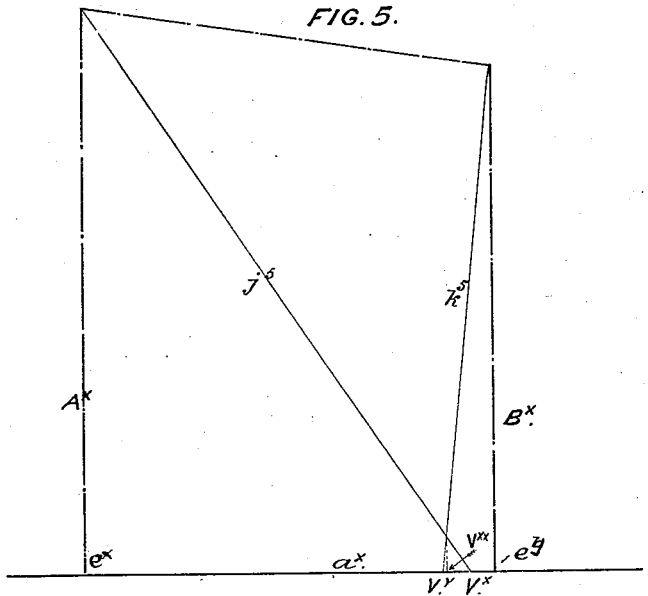
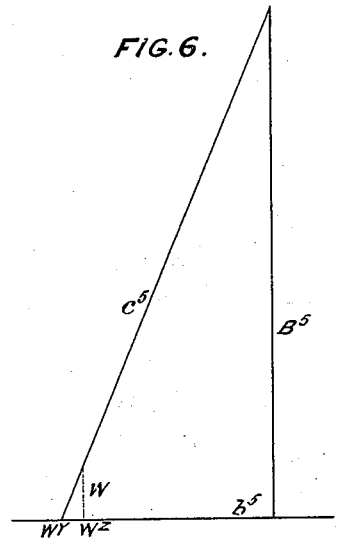
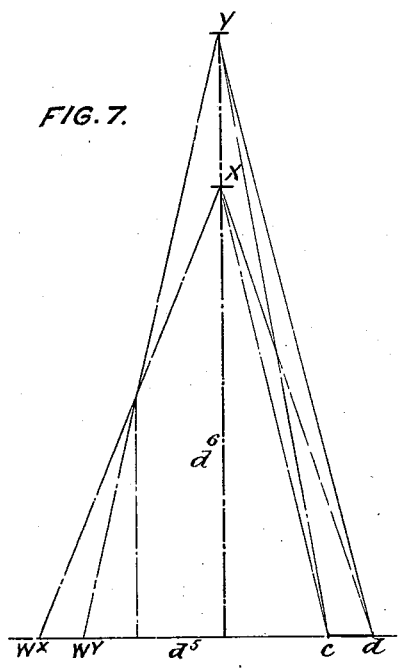
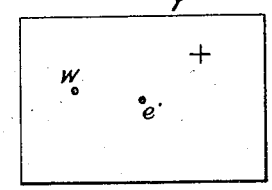
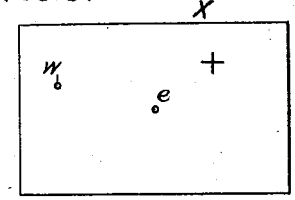
WITNESSES:
Fred G. Dieterich
M. D. Blondel
INVENTOR
Cornele B. Adams
BY Munn
ATTORNEYS.

UNITED STATES PATENT OFFICE.

CORNELE BERRIEN ADAMS, OF AUGUSTA, GEORGIA.

METHOD OF PHOTOGRAMMETRY.

SPECIFICATION forming part of Letters Patent No. 510,758, dated December 12, 1893.

Application filed February 9, 1893. Serial No. 461,597. (No model.)

*To all whom it may concern:*

Be it known that I, CORNELE BERRIEN ADAMS, residing at Augusta, in the county of Richmond and State of Georgia, have invented a new and Improved Method of Photogrammetry, of which the following is a specification.

By means of aerial photography vertical views of flat tracts have been so taken that if the altitude from which the photographs are taken, be known, the horizontal configuration of such tract can be reproduced topographically, and the distances between the different horizontal points determined. In the use of such aerial apparatus, in cases, of mountainous or hilly tracts, neither the elevation or horizontal distances can be truly and accurately obtained, without the aid of other altitude instruments.

My invention has for its object to produce a method of obtaining aerial photographs, in such a manner, that the pictures obtained can be converted into topographical maps, to delineate not only the horizontal positions and distances of the objects correctly, but from which the altitude of the objects can be quickly and accurately ascertained, and such results obtained without the aid of other field instruments.

My invention has also for its object to produce a method in which the results stated can be obtained in a simple manner with absolute accuracy.

To these ends my invention consists in the peculiar and novel method hereinafter described and pointed out in the claims, reference being had to the accompanying drawings, in which—

Figure 1:
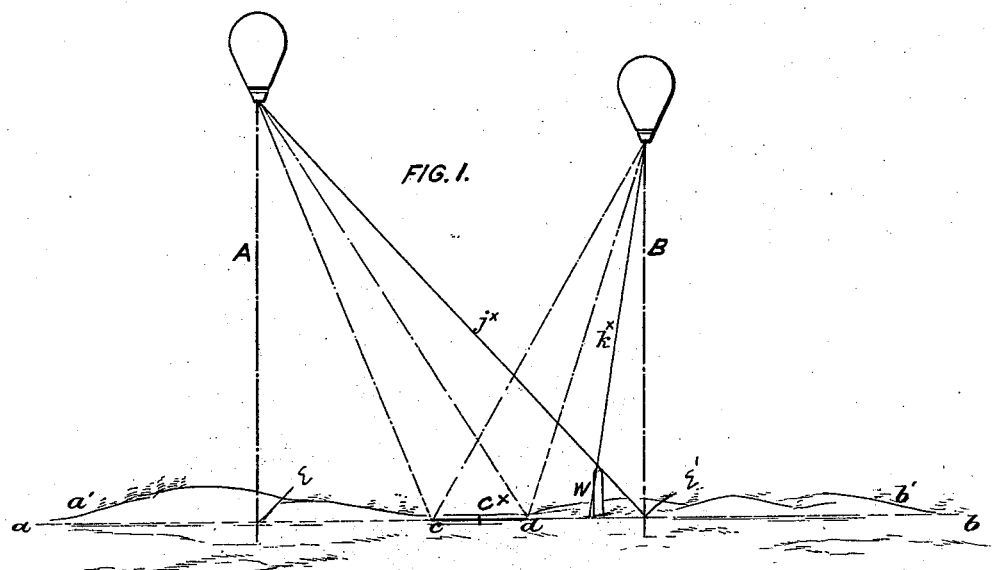
Figure 2:
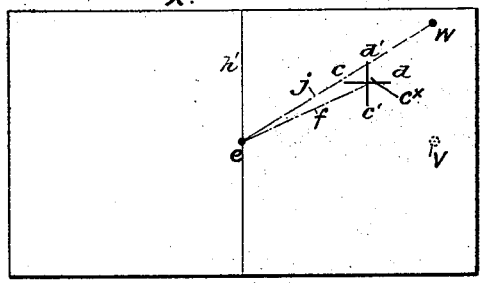
Figure 3:
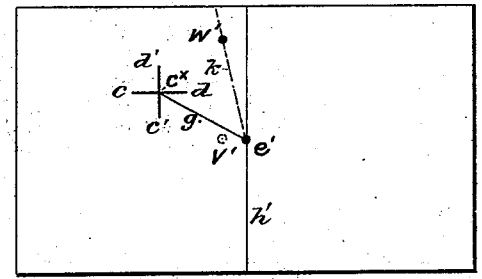
Figure 4:
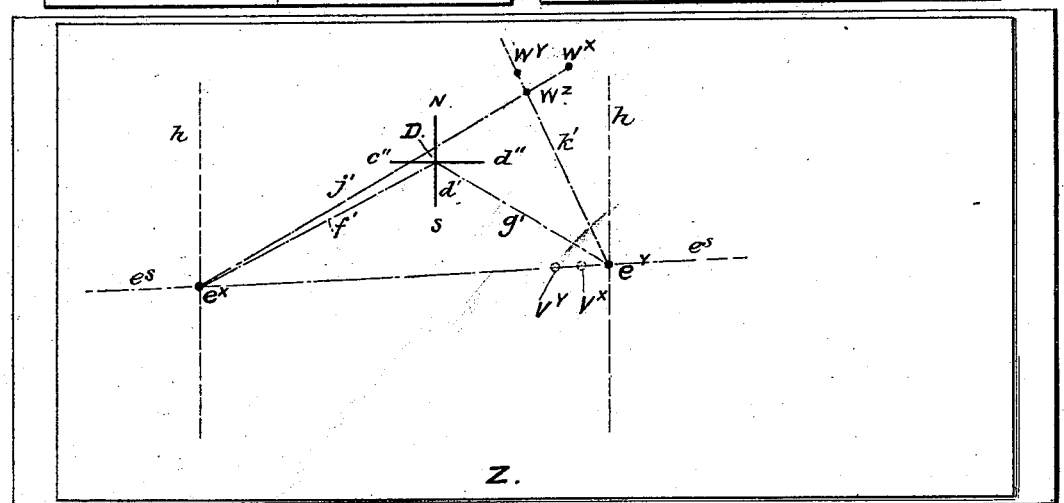

Figure 1 is a diagrammatic view, illustrating the manner in which the two aerial negatives are taken of the object, from different points and altitudes. Figs. 2 and 3 are views representing respectively, the negatives taken at the points A and B, and indicating the position of the base line relatively to the visual point. Fig. 4 is a diagrammatic illustration of the method of transferring to the drawing board the two apparent positions of the object and the manner in which the true position is obtained. Fig. 5 is a diagrammatic view hereinafter specifically referred to. Fig. 6 is a diagram illustrating the manner in which the altitude of the object is arrived at. Fig. 7 is a view illustrating the manner of obtaining the two exposures from different altitudes but in the same vertical plane, and Figs. 8 and 9 represent respectively the negatives taken at the points Y—X on Fig. 7.

In the utilization of aerial photography it is well known that the varying heights of objects causes perspective in the photograph, and therefore such photograph fails as a true map or plan representation of the objects. In my improved method I utilize such perspective to obtain a true topographical representation and the necessary horizontal corrections at the same time. Such method is best explained as follows: Referring now to Fig. 1 of the drawings in which $a-b$ indicate the datum-plane and $a'-b'$ the tract of which it is desired to take the view. A horizontal base line $c^x$ having been measured and marked off on the datum plane, an aerial camera is sent up at the point marked A, which camera is set to automatically operate to make an exposure, when it reaches a predetermined height, such operation being effected by any of the well known means, but preferably by the special mechanism invented by me, which forms the subject matter of a separate application filed by me on February 10, 1893, Serial No. 461,798. In such mechanism it should be stated means are also provided whereby the balloon or the camera supporting devices begin to descend, immediately after the exposure is made. Upon the negative thus taken the base or level $c-d$ is represented at a point to the right of the center or visual point $e$. See Fig. 2.

It will be noticed that the base $c^x$ is formed of two lines $c-d$ $c'-d'$ arranged at right angles, and to bisect each other centrally, the bisecting point forming a center from which angles are projected in a manner presently explained. This base or cross line also serves as a means for determining the value of the negative, in that, should such negative be taken when the camera is not in a true horizontal position, one or more of the radial arms of the cross line will appear foreshortened in the negative, and when so delineated the operator will be able to ascertain at a glance that such negative is valueless for the purposes intended.

While I prefer to use a fixed base arranged in the manner shown, I desire it understood that a crossed base line is not actually necessary, as in some instances the adjustment of the camera may be depended on alone to indicate if the exposure was made on a true horizontal plane. Further a fixed base line may be entirely dispensed with, and an imaginary line drawn from any two points whose altitudes are the same, may be employed. In this case however, as in the other, the distance between such points must be known. A balloon is then sent up at a point at the other side of the base line $c-d$ as indicated at B, and the same tract, in perspective viewed from a different direction from the first exposure is produced on the negative, and in this instance the base $c^x$ will appear on the left of the center $e'$ of such negative as indicated in Fig. 3.

It should here be stated that by the use of a fixed base line, it is not necessary that the two exposures be made exactly from the same altitude. Furthermore no definite height from which the exposure is made is necessary, as in all cases the distances on each photograph will be measured on a scale determined by the base line representation on each particular negative or photograph. The latter operation concludes the field work, for the particular tract taken.

To now produce a topographical representation of the scene delineated on the two negatives, in a true and accurate manner, the following steps are taken: Upon the drawing board is drawn a base line D to represent the base line $c-d$, and such base line D which may be of a size governed by the scale on which it is desired to make the drawings, is then divided off to form a scale from which all the measurements of the drawings are determined, and such base line may also indicate the points of the compass as the base line $c-d$ is usually so located that its line $c'-d'$ points north and south. A line $f$ is then drawn from the center of the base line $c-d$ to the visual point $e$ on the first negative (or photograph) which we will term the X negative. Then by means of a protractor the angle between such line $f$ and the vertical line $c'-d'$ of the base $c-d$ is determined. An indefinite line $f'$ from the center of base line D is then projected at the same angle on which line $f$ is drawn. The distance between the center of the base $c-d$ and the point $e$, is then obtained, using the scale determined by line $c-d$, and the same distance is then measured off (using the scale determined by line $c''$ $d''$ on the line $f'$, which measurement locates a center $e^x$ corresponding to the center $e$ of the negative X. A line $g$ is then drawn from the center of the base $c-d$ on the negative Y to center $e'$ of such negative, after which the angle of such line is ascertained, and a line on the same angle is then drawn from the center of base D on the map, and projected as at $g'$ in a corresponding direction to the line $g$; the distance between the center of base $c-d$ and the center $e'$ is then determined and such center $e$, transmitted to the map Z and located as shown at $e^y$. Lines $h-h$ are then projected from the points $e^x-e^y$ on the map parallel with the line $d'$ of the base D which are duplications of similar lines $h'$ fixed on the negatives.

Now assuming W to indicate an objective point on negative X, and W' the same point on negative Y, such apparent positions are transmitted to the map as follows: A line $j$ is drawn on negative X from the center point $e$ to point W and the angle on which such line is drawn ascertained. This angle may be measured from a line connecting the centers $e-e'$ or from the line radiating from the center of base line in each case, instead of from the N and S lines $h-h'$ fixed for the purpose. A line $j'$ is then projected (on the same angle as line $j$) on the map Z see Fig. 4, in a direction corresponding to the said line $j$ on negative X. The distance of the point W from point $e$ is then ascertained, and such distance is marked off on the line $j'$ on the map. Thus the apparent position of the objective point W as seen from one direction (A Fig. 1) is located on the map. The same objective point on the negative Y is connected with the center $e'$ and by the line $k$ and such line and point are produced on the map in the manner in which the line $f$ in negative X was obtained the line $j'$ and point W were obtained. Thus the apparent positions W W' as seen from different directions are located on the map. Now by reference to Fig. 4 it will be noticed that the lines $j'$ and $k'$ which as it were indicate the vision or focus lines $j$ $k$ of the two exposures radiating from the cameras see Fig. 1 to the particular object, intersect each other at $W^z$, which point represents the true horizontal position of the objective point W referred to. In the manner described the true horizontal position of all the objective points of the picture can be accurately transferred to the map except such as would fall in a line $e^s$ drawn from $e^x$ to $e^y$ or projected therefrom. Such points cannot be ascertained in the manner before stated, in that the lines from the visual points $e-e'$ to the objective points which fall on the line $e^s$ would not intersect each other horizontally at points to either side of such line $e^s$, but would cross in a plane directly over such line. To obtain the true position of any object on such line $e^s$ I construct the diagram shown in Fig. 5, in which the lines $A^x$ $B^x$ indicate the vertical lines at which the two exposures were made and $a^x$ the horizontal plane. Assuming V to indicate an objective point on negative X located in a direct line between the vision points $e$ $e'$ and V' the same point on negative Y, such apparent positions when constructed on the drawings will appear as at $V^x$ and $V^y$. The distance between the points $e^x$ and $V^x$ is then measured off on the base $a^x$ measuring from the line $A^x$ and the distance between $e^y$ and $V^y$ similarly marked off, measuring from line $B^x$. These apparent points are then connected to the upper end of lines $A^x$ $B^x$ by the lines, $j^5$ $k^5$ respectively which in this case indicate the vision lines similar to lines $j^x$ $k^x$ in Fig. 1. By this method I am enabled to ascertain the intersecting point of the vision lines, from the two exposures, which fall in a plane directly between the visual points $e$—$e'$ which fall in the same vertical plane as the two points $e$ $e'$ and such intersecting points indicate the true positions. The true horizontal positions having been thus obtained, the altitude of the object is readily arrived at by constructing a triangle whose vertical line $B^5$ (see Fig. 6) represents the altitude from which the negative was taken, its base $b^5$ being of a length equal the apparent distance of the object from the visual point. The difference between the true horizontal distance and apparent distance is then pointed off on the base line $b^5$, and a line drawn vertical from the true distance points, until it intersects the hypotenuse $c^5$. This intersection points off the altitude of the object the exact height of which is determined in the usual manner, the altitude of vertical line $B^5$ being known.

In Fig. 7 I have shown a modified method of obtaining the two negatives. In this case both exposures are made on the same vertical line but at different altitudes. When the negatives are taken in this way the base $c$—$d$ will appear at the same point on each negative. The transferring of the visual points $e$—$e'$ of the two negatives X and Y is accomplished in the same manner as heretofore, but one central point however will appear on the map, as the points $e$ and $e'$ fall in the same vertical line. It will also be obvious that all the projections or distance points will radiate from this one center, and all corresponding objective points in the two negatives will be in the same radial line.

Referring now to Figs. 8 and 9, should W indicate an objective point on negative X the distance of such point will be measured by the scale determined by the base $c$—$d$ thereon, and such distance be pointed off on the base line $d^5$ of a triangle whose vertical line $d^6$ has the two altitudes (from which the two exposures were taken) indicated thereon as at X and Y, such measurement on the base line $d^5$ will give the apparent point of the "object" W on negative X. The distance of the same objective point is taken on negative Y and transferred to base line $d^5$, which gives the apparent point of such object W on negative Y. Lines are now drawn from the points $W^x$ and $W^y$ to the altitude points X and Y respectively as shown in Fig. 7, the point of intersection of such lines indicating in this case the true horizontal and vertical position of object W.

So far as described I have illustrated the manner of finding the true horizontal positions of objects located at the point on or above the base or datum plane $c$—$d$. It is obvious however that in case of depressions or other instances where the object is below the datum plane, the apparent points will fall short of the intersection point, and such intersection or true point would appear at a point below the datum plane. The altitudes in this case are arrived at mathematically in the same manner as before. When the two exposures are made in the manner last stated the altitudes of all the points except such as would fall directly or nearly so under the visual point can be taken and located. The altitudes at which the pictures are taken may also be arrived at by comparing the length of picture of base line with the length of picture of this base line at some known distance, provided the focal distance of the camera by which the different pictures are taken is a fixed one.

Having thus described my invention, what I claim, and desire to secure by Letters Patent, is—

1. An improved method of photogrammetry, which consists in first taking aerial photographs of the same object or tract from different altitudes, and secondly in determining the intersection of the vision lines of such different photographic exposures, by geometrical and mathematical means, substantially in the manner hereinbefore described.

2. An improved method of photogrammetry which consists in first taking two aerial photographs of the same tract or object from over different points of the tract and secondly in determining the intersection points of the vision lines of such different photographic exposures by geometrical or mathematical means, substantially in the manner hereinbefore described.

3. An improved method of photogrammetry which consists in first laying off a horizontal fixed base, the distance between the ends of which is known, secondly in taking two aerial photographs of the object or tract including the fixed base line, from different altitudes, thirdly in pointing off the apparent distances of the objects on each negative determined by the representation of the fixed base, and fourthly determining the intersecting points of the apparent positions and distances of the different photographic representations by geometrical and mathematical means substantially in the manner heretofore described.

4. A method for producing topographical maps by the aid of photography, which consists in first locating a fixed horizontal base line of a known length on the tract to be reproduced, secondly taking two photographs from different points of such tract, thirdly, in ascertaining the apparent objective points on each negative by a scale determined by the fixed base line representations on the negatives, and fourthly in determining the intersection lines of the objective points as located on the negatives, by geometrical and mathematical means whereby the true horizontal positions of such objective points are obtained substantially in the manner and for the purposes described.

5. The method of obtaining topographical maps by the aid of photography, which consists in locating on the tract a fixed horizontal base line, having points the distances between which are known, then making two aerial photographs of such tract, from different points, and finally determining the true horizontal and vertical points of intersection of the vision lines of the two photographs, by geometrical and mathematical calculation, substantially in the manner and for the purpose described.

6. The hereinbefore described method of producing topographical maps by the aid of photography, which consists in the following steps, viz, first locating a fixed horizontal base line, of a known length, second, taking two aerial photographic views of the tract at different angles, then locating the distance and direction of the object on each negative from its center or visual point, then transmitting the apparent points thus obtained to the map by geometrical calculation, then determining the distance of the true positions or points of intersection of the two apparent points to radiating lines, and then pointing off the true and apparent points of the object on a triangle whose base represents a length equal the apparent position, its vertical line the known altitude from which the picture was taken, and then intersecting the hypotenuse of such triangle by a line drawn from the true position parallel with the aforesaid vertical line all substantially in the manner set forth.

7. A method of obtaining maps from aerial photographs, which consists, first, in establishing a base line of known length upon the ground, secondly, in taking two views from different points over the tract; thirdly, in determining the relative positions of the two exposures by measuring the bearing and distance of the optical center on each photograph from the picture of the base line, using the latter as a scale for distance; and fourthly, in orienting from the centers thus placed to determine the position of any object on the tract.

8. An improved method of photogrammetry, which consists in establishing one or more horizontal base lines, whose extremities and middle points are marked, to determine first, if the sensitive plate was horizontal at the moment of exposure, and secondly as a means of determining the height at which the exposure occurred all substantially as and for the purposes described.

9. An improved method of photogrammetry, which consists in establishing a horizontal base line marked upon the ground so as to appear in the pictures of two or more overlapping views, for the purpose of determining the relative positions of the exposures substantially in the manner described.

CORNELE BERRIEN ADAMS.

Witnesses:
FRED G. DIETERICH,
SOLON C. KEMON.